Sept. 10, 1946.  A. F. HOESEL  2,407,553
PIPE THREAD GASKET
Filed Feb. 15, 1945
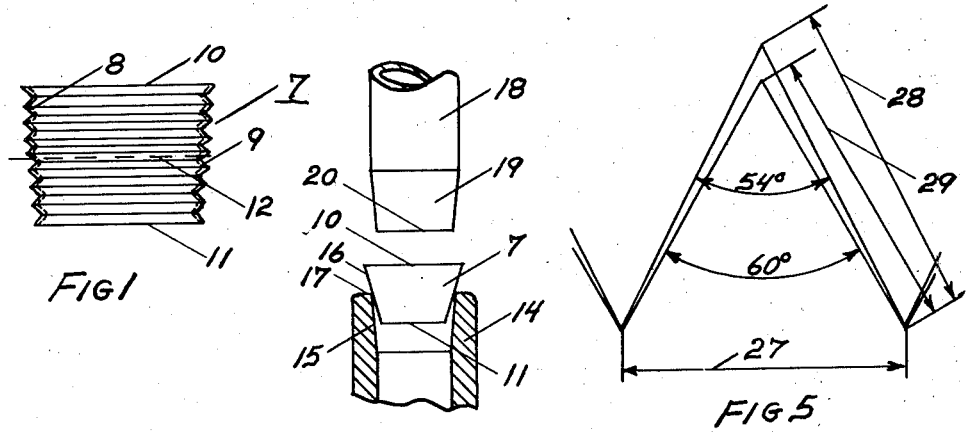
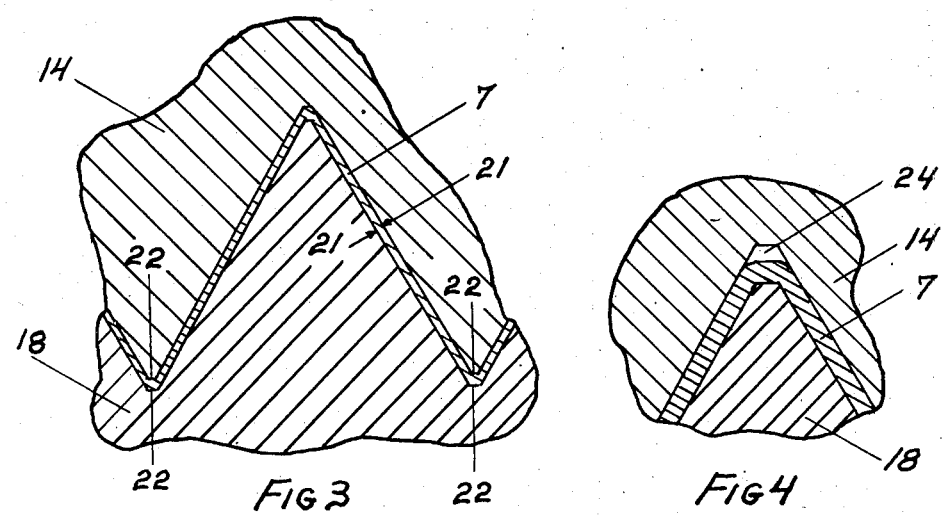
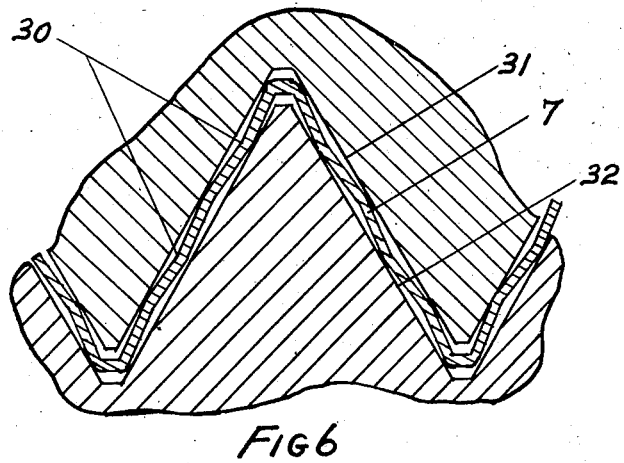
INVENTOR.
Anthony F. Hoesel Patented Sept. 10, 1946

2,407,553

UNITED STATES PATENT OFFICE 2,407,553

PIPE THREAD GASKET

Anthony F. Hoesel, Chicago, Ill., assignor to Flow Controls, Incorporated, Chicago, Ill., a corporation of Illinois Application February 15, 1945, Serial No. 578,088

3 Claims. (Cl. 288—20)

The present invention pertains to pipe thread gaskets and relates, in part, to my present pending applications Serial No. 543,085 filed July 1, 1944, Serial No. 563,481 filed November 15, 1944, Serial No. 566,451 filed December 4, 1944, Serial No. 570,628 filed December 30, 1944, Serial No. 579,859 filed February 26, 1945, and Serial No. 594,771 filed May 19, 1945.

As brought out in my present pending application Serial No. 563,481 filed November 15, 1944, it is very desirable to have the pipe thread gaskets with walls of non-uniform thickness: the wall normal to the thread slopes should be initially of lesser thickness than the wall at the thread mating crests and roots. Theoretically, at least, a pipe thread gasket, of uniform wall thickness and proper ductility, will arrive at this condition whenever the male and female taper pipe thread components, having the pipe thread gasket therebetween, are firmly wrenched up. At that time the pipe thread gasket material will completely fill up any and all spaces between the mating threads.

Certain materials, suitable for use under certain conditions and certain fluids flowing through the pipes are not sufficiently ductile for the purpose, in view of the comparatively large contact surface areas between which the pipe thread gaskets are compressed due to the wrenching up of the joint.

For instance, let us consider a 1½" American Standard pipe thread. It has a mean pitch diameter of 1.8" and the length of engagement is approximately .6". Due to the functions of the 60° thread form, we find that a traversal of the thread slopes, for this .6" engaged length, actually results in a length of 1.2". To now find the contact surface area we proceed as follows: 1.8" P. D. x 3.1416=5.655" circumferential length. 5.655" C. L. x 1.2" engaged length= 6.786 square inch contact surface area.

Even with the more ductile metals, it can be readily realized that a tremendous wrenching effort must be applied in order to induce a plastic flow, of the material comprising the pipe thread gasket, in order to fill any and all possible spaces between the mating threads, which, in practice, widely vary from the theoretical ideal, and thereby increase the difficulty encountered even with ideal threads.

In view of the above, it is readily apparent that any pipe thread gasket having, initially, an approximate cross-sectional form of the finished type, as when properly wrenched up, will readily form a leak proof joint with a minimum wrenching effort.

Now, there are two ways of accomplishing this desired result. The first is that of manufacturing the pipe thread gasket to the desired theoretical cross-sectional form. This is a comparatively difficult and expensive operation with presently known methods. The second, and which is the subject matter of the present invention, is to make the walls of substantially uniform thickness throughout but to make the thread form thereof differently than the standard thread form of the American standard taper pipe thread.

An object, of the present invention, is to make a pipe thread gasket which will produce a tight joint with a minimum wrenching effort.

Another object, of the present invention, is to make a pipe thread gasket, suitable for its purposes, which is readily and inexpensively manufactured.

Further objects, of the present invention, will be disclosed in the following specification and claims.

Referring to the drawing:

In Fig. 1, I show a side view of the pipe thread gasket 7 made of any suitable material, metallic or otherwise, and having an internal thread 8 and an external thread 9. The open end 10 is of a larger diameter than the open end 11 and the difference, therebetween, defines a taper which I prefer to make greater than the standard ¾" diametral taper per foot of the American standard pipe thread. Let us assume that the taper is 1¼" per foot.

The point 12, approximately midway between the ends 10 and 11, has an effective diameter which just engages the open end of a standard female pipe thread; therefore when the pipe thread gasket 7 is screwed into the female thread, by hand, some of the length projects outside of the female thread.

Fig. 2, which is diagrammatic and somewhat exaggerated, shows why I prefer to make the pipe thread gasket of a greater diametral taper than the standard.

The female pipe thread component 14 has a standard taper pipe thread diagrammatically illustrated by the taper bore 15. The pipe thread gasket 7 has a greater taper 16 than the taper 15. This allows a ready insertion of the pipe thread gasket 7 into the bore 15 until the point 12, of Fig. 1, meets the face 17 of the female pipe thread component 14 and tends to be hand tight.

The male threaded component 18 has a standard taper pipe thread diagrammatically illustrated at 19. Inasmuch as the end 20 is considerably smaller than the large open end 10, of the pipe thread gasket 7, the male threaded component 18 can easily enter the pipe thread gasket 7. Generally it can be hand screwed to a point several threads within the face 17, at which time the application of wrenching effort sets up the joint. The wrenching effort tends to further screw the pipe thread gasket 7 into the female component 14. The large end 10 tends to contract and the small end 11 tends to expand as the gasket 7 screws into the female component 14 and the male component 18 screws into the gasket 7 respectively.

In Fig. 3, I show a single thread section of the male component 18 and female component 14 when wrenched up with the gasket 7 occupying the entire space separating the two threads. It will be noted that the gasket wall thickness along line 21—21, normal to the thread slope, is less than the gasket wall thickness along lines 22—22 between the mating thread crests and roots. Actually, with a theoretically perfect thread, the difference in thickness would be as 1 to 2.

Presently, we may consider the gasket 7 as having had an initial form as shown in this case, or its walls may have, initially, been of uniform cross-sectional thickness and the material sufficiently ductile so that the wrenching up induced plastic flow so that the necessary excess material was extruded, along the thread slopes, into the spaces at the lines 22—22.

In Fig. 4, I show a part thread section illustrating the result, at the mating crest and root, if the gasket 7 is insufficiently ductile to produce the plastic flow as mentioned above. Note the unfilled space 24. In this case the pipe thread joint would have two helical leak flow paths, one along the root of the female thread, and the other along the root of the male thread.

In Fig. 5, I illustrate one form of thread, departing from the standard form, which I form upon the pipe thread gasket 7. In the particular instance, the included angle is 54° as against the standard 60° included angle. For a given pitch 27, of the thread, this 54° included angle thread form gives approximately 12½% greater thread slope length 28 than the thread slope length 29 of a 60° included angle thread form, which is the standard.

Since the thread gasket 7 is retained between the mating threads, male and female, the thread form must eventually change from 54° to 60° and the 12½% greater length must finally vanish. This vanishment occurs by means of the extra length being forced toward the thread crests and roots where it fills up the spaces.

In Fig. 6, I illustrate the effect, upon the thread slopes 30, of the gasket 7, whenever the mating threads 31 and 32 are partly screwed up. It will be noted that the slopes 30 now have a somewhat corrugated form which is restrained by the slopes of the threads 31 and 32. As the threads 31 and 32 are wrenched up, the corrugation flattens out producing a compressive force toward the roots and crests of the threads 31 and 32. In this manner the 12½% excess length finally disappears.

So far, I have shown the thread slopes, of the thread gasket 7, as being initially flat and the corrugation effect taking place during the wrenching up of the threads. I do not wish to be limited thereto since I also intend, in some instances, forming the corrugation prior to the assembly of the gasket with the male and female threads.

While I have used definite angles and lengths in the above, they are merely for guidance and illustrate a specific embodiment of the invention which may be variously modified without departing from the spirit and scope of the invention, which is to be limited only to the following claims.

I claim:

1. A pipe thread gasket comprising, in combination, a thin walled tapered tubular form having complementary internal and external threads upon the diametral surfaces thereof, and the slopes of the threads having a wavy form in the circumferential plane of the slopes.

2. A pipe thread gasket comprising, in combination, a thin walled tapered tubular form having complementary internal and external threads upon the diametral surfaces thereof, the said threads having an included angle less than sixty degrees and the slopes of the threads having a wavy form in the circumferential plane of the slopes.

3. A pipe thread gasket comprising, in combination, a thin walled tapered tubular form having complementary internal and external threads upon the diametral surfaces thereof, the said threads having an included angle less than sixty degrees, the slopes of the threads having a wavy form in the circumferential plane of the slopes, and the diametral taper being greater than three-quarters inch per foot.

ANTHONY F. HOESEL.